United States Patent
Lian et al.

(10) Patent No.: US 10,551,579 B2
(45) Date of Patent: Feb. 4, 2020

(54) FERRULE-TO-LENS LATCH MECHANISM

(71) Applicant: Finisar Corporation, Sunnyvale, CA (US)

(72) Inventors: Jia Lian, Shanghai (CN); Yandong Mao, Shanghai (CN); Shamei Shi, Shanghai (CN); William H. Wang, Pleasanton, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 16/119,875

(22) Filed: Aug. 31, 2018

(65) Prior Publication Data
US 2020/0012056 A1 Jan. 9, 2020

(30) Foreign Application Priority Data

Jul. 9, 2018 (CN) .......................... 2018 1 0744633

(51) Int. Cl.
*G02B 6/42* (2006.01)
(52) U.S. Cl.
CPC .......... *G02B 6/4261* (2013.01); *G02B 6/423* (2013.01); *G02B 6/4204* (2013.01); *G02B 6/4292* (2013.01)
(58) Field of Classification Search
CPC .... G02B 6/423; G02B 6/4204; G02B 6/4261; G02B 6/4292
See application file for complete search history.

(56) References Cited

U.S. PATENT DOCUMENTS

| 6,331,081 B1 * | 12/2001 | Ohtsuka | G02B 6/2552 385/51 |
| 9,020,322 B2 * | 4/2015 | Chan | G02B 6/4214 385/139 |
| 2006/0029332 A1 * | 2/2006 | Chiu | G02B 6/3893 385/53 |

(Continued)

FOREIGN PATENT DOCUMENTS

| EP | 0969300 A2 | 1/2000 |
| EP | 1118892 A1 | 7/2001 |
| JP | 2011247952 A | 12/2011 |

OTHER PUBLICATIONS

International Search Report and Written Opinion, as issued in connection with International Patent Application No. PCT/US2019/041073, dated Sep. 20, 2019, 13 pgs.

(Continued)

*Primary Examiner* — Thomas A Hollweg
*Assistant Examiner* — Mary A El-Shammaa
(74) *Attorney, Agent, or Firm* — Maschoff Brennan

(57) ABSTRACT

A ferrule-to-lens latch mechanism includes a cover movable with respect to a housing of an optical assembly between an open position in which a cavity defined by the housing is visible and a closed position in which the cavity is covered by the cover. A lens is positioned in the cavity and has one or more guide pins which are visible when the cover is in the open position prior to mating a ferrule to the lens. A spring clip coupled to the housing and positioned in the cavity is configured to allow insertion and removal of the ferrule from the cavity when the cover is in the open position and may bias the ferrule against the lens when the ferrule is mated to the lens. When the ferrule is mated to the lens, the cover may cooperate with the spring clip to inhibit removal of the ferrule.

20 Claims, 13 Drawing Sheets

(56) References Cited

U.S. PATENT DOCUMENTS

| | | | |
|---|---|---|---|
| 2013/0156386 A1* | 6/2013 | Miller | G02B 6/4284 385/93 |
| 2014/0241688 A1* | 8/2014 | Isenhour | G02B 6/3825 385/135 |
| 2015/0030299 A1* | 1/2015 | Chan | G02B 6/4214 385/134 |
| 2015/0362686 A1 | 12/2015 | Wang et al. | |
| 2016/0091670 A1 | 3/2016 | Akieda et al. | |
| 2017/0227718 A1* | 8/2017 | Akieda | G02B 6/3821 |

OTHER PUBLICATIONS

International Search Report and Written Opinion dated Sep. 20, 2019, in related PCT Application No. PCT/US2019/041073.

* cited by examiner

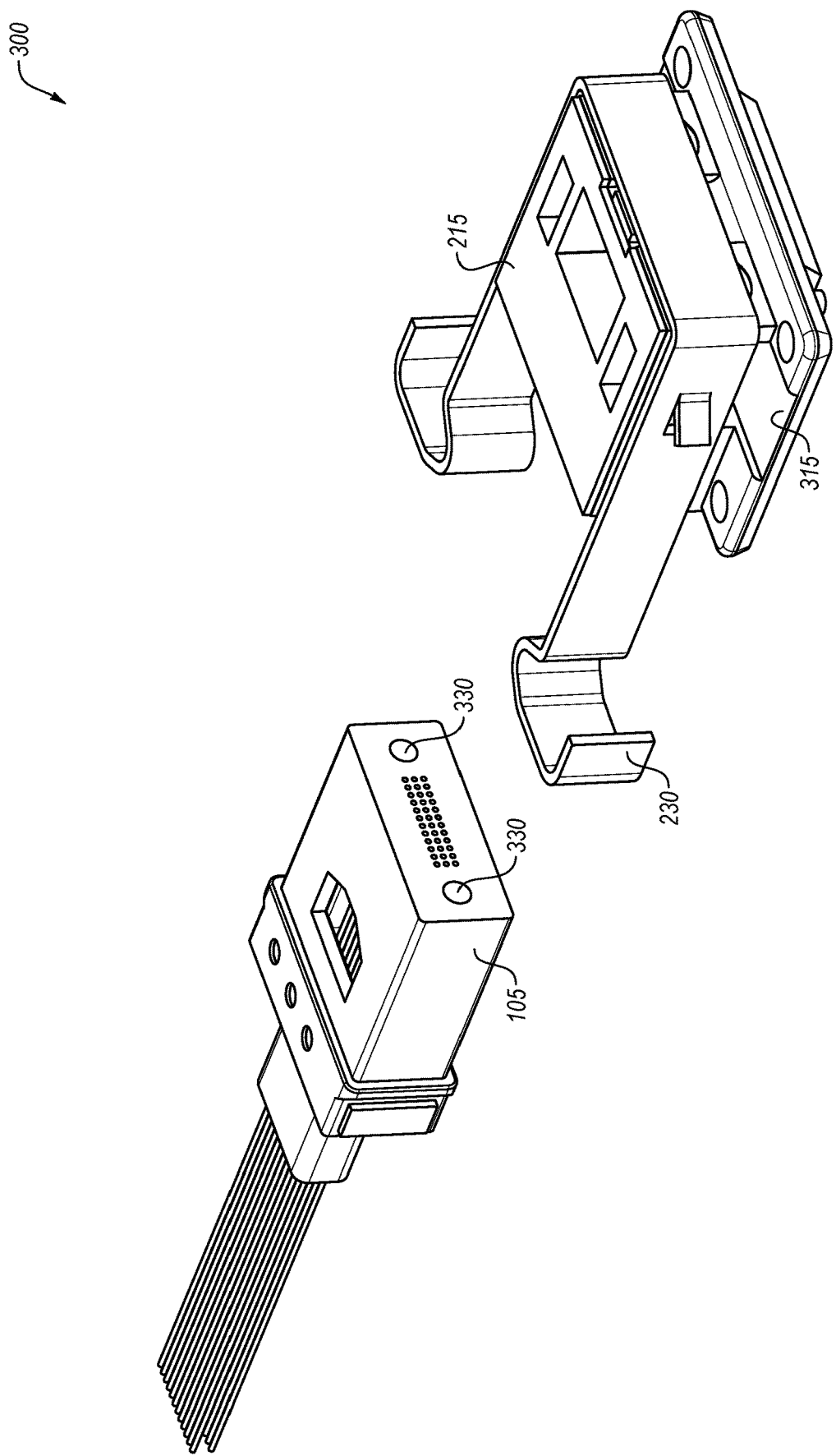

FERRULE-TO-LENS LATCH MECHANISM

CROSS-REFERENCE TO RELATED APPLICATIONS

This application claims priority to Chinese Application Serial No. 201810744633.1, filed on Jul. 9, 2018; the disclosure of which is incorporated by reference herein.

FIELD

The application relates generally to ferrule-to-lens latch mechanisms.

BACKGROUND

Unless otherwise indicated herein, the materials described herein are not prior art to the claims in the present application and are not admitted to be prior art by inclusion in this section.

A host may be connected to an optical network through one or more board mounted optical assemblies (BOAs). Each BOA may connect the host to the optical network through a ferrule, a fiber, and other various components of the BOA. For example, various components of the BOA may include a lens, a printed circuit board (PCB), transducer (s), etc. within a housing of the BOA. The housing and the other various components of the BOA, including their configurations relative to each other, may help to determine, for example, how the ferrule and the fiber physically connect to the BOA.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments described herein generally relate to ferrule-to-lens latch mechanisms.

In an example embodiment, a ferrule-to-lens latch mechanism includes a cover and a spring clip. The cover may be movable with respect to a housing of an optical assembly between an open position in which a cavity defined by the housing is visible (or exposed) and a closed position in which the cavity is covered by the cover. A lens of the optical assembly may be at least partially positioned in the cavity and may have one or more guide pins which are visible (or exposed) in the cavity when the cover is in the open position prior to mating a ferrule to the lens within the cavity. The spring clip may be coupled to the housing and positioned at least partially in the cavity. The spring clip may be configured to allow insertion and removal of the ferrule from the cavity when the cover is in the open position and may be configured to bias the ferrule against the lens when the ferrule is mated to the lens. When the ferrule is mated to the lens within the cavity and the cover is in the closed position, the cover may be configured to cooperate with the spring clip to inhibit removal of the ferrule from the cavity.

In another example embodiment, an optoelectronic system may include an optical network and a host connected to the optical network through one or more board mount optical assemblies (BOAs). Each of the one or more BOAs may include a housing, a cover, and a spring clip. The housing includes a cavity to at least partially encase a lens. The cover may move relative to the housing between an open position and a closed position. When the cover is in the open position, the cavity of the housing may be exposed. When the cover is in the closed position, the cavity of the housing may be covered by the cover. A lens may be positioned within the cavity of the housing. The lens may include guide pins for mating with a ferrule. When the cover is in the open position, the guide pins of the lens may be exposed. When the cover is in the closed position, the guide pins of the lens may be covered. The spring clip may be positioned at least partially inside the cavity. The spring clip may include an end, which the ferrule may be inserted into and removed from upon entering and exiting the cavity. After insertion of the ferrule into the end of the spring clip, the spring clip may apply a force against the ferrule so as to push the ferrule against the lens. When the cover is in the open position, the ferrule may freely enter and/or exit the spring clip, e.g., mate with and/or withdraw from the lens inside the cavity. When the cover is in the closed position, the ferrule may not freely enter and/or exit the spring clip, e.g., inhibit the ferrule from mating with and/or withdrawing from the lens inside the cavity.

In another example embodiment, a method to provide a secure ferrule-to-lens connection may include moving a cover connected to a housing of an optical assembly to an open position to expose male guide pins of a lens of the optical assembly. The male guide pins of the lens may be positioned within a receptacle portion of a spring clip. The method may also include visually aligning the male guide pins of the lens with corresponding female openings of a ferrule. The method may also include inserting the ferrule into an opening in the spring clip. As the ferrule is inserted, a portion of the spring clip near the opening may flex outward to help allow for insertion of the ferrule. The method may also include mating the male guide pins with the female openings of the ferrule. The mating may be complete when the portion of the spring clip near the opening pushes against a back-end of the ferrule. The method may also include moving the clover of the optical assembly to a closed position such that lock pins of the cover cooperate with the spring clip to inhibit removal of the ferrule from the lens of the optical assembly.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

Example embodiments will be described and explained with additional specificity and detail through the use of the accompanying drawings in which:

FIG. 3C is an upper rear perspective view of the ferrule, lens, and spring clip of FIG. 3B;

DESCRIPTION OF EMBODIMENTS

Figure 1:
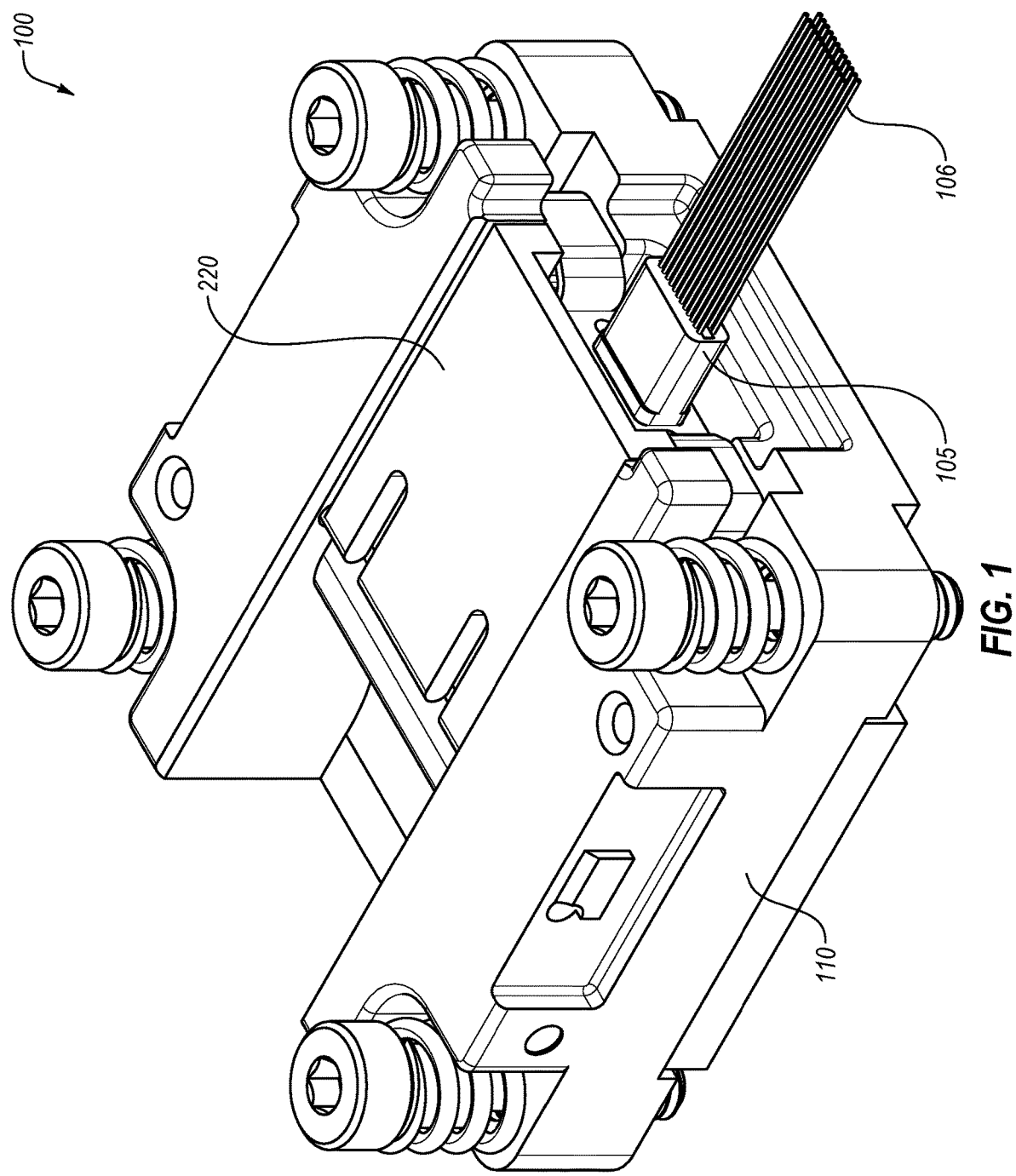
FIG. 1 illustrates an example ferrule and BOA with a movable cover.

The connection between a ferrule and a BOA may, in some applications, be an unseen connection. For example, the connection may be unseen due in part to occurring within a cavity of the BOA defined by a housing of the BOA. In some applications, the housing may extend over or otherwise cover a position of the connection between the ferrule and the BOA. In this manner, the connection may be achieved, according to some applications, in a "blind" manner such that at least a portion of the connection process between the ferrule and the BOA occurs without visibility to some degree. Various embodiments as described in this disclosure may affect the connection between the ferrule and the BOA. Additionally or alternatively, various embodiments described in this disclosure may affect a process of connecting the ferrule to the BOA and/or disconnecting the ferrule from the BOA.

Some embodiments described in this disclosure may include a BOA with a housing that may define a cavity inside the BOA. For example, positioned within the cavity may be a lens or other component for transmitting optical signals into and/or out of the BOA. In these or other embodiments, the lens within the cavity may be partially revealed or made visible or exposed in some degree via an opening in the housing. For example, the opening in the housing may be covered or uncovered by a housing cover that may move, relative to the housing, between an open position and a closed position. Additionally or alternatively, when the housing cover is in the open position, the lens and/or other components of the BOA may be at least partially exposed to visual inspection. With the lens and/or other components of the BOA visibly exposed, the ferrule may be visually aligned with the lens for initiating a proper connection. For example, the lens may have a male guide pin that may correspond to a female opening in the ferrule, and visual alignment of the male guide pin and the female opening may help to promote ease of connection and/or help to reduce a likelihood of component damage from improper or unsuccessful attempts at connecting the ferrule to the BOA.

In some embodiments, when the housing cover is in the closed position, the cavity within the BOA may be at least partially covered, at least partially unexposed, and/or not revealed. For example, the lens and/or other components of the BOA may not be visibly exposed when the housing cover is in the closed position. In these or other embodiments, the housing cover may be moved to the open position to form a proper connection between the ferrule and the BOA. After forming the proper connection between the ferrule and the BOA, the housing cover may be moved to the closed position such that the connection between the ferrule and the BOA may not be visible and/or exposed.

Additionally or alternatively, the housing cover may at least partially secure the connection between the ferrule and the BOA when in the closed position. For example, when the housing cover is in the closed position after the ferrule is connected to the BOA, the connection may become a locked connection via certain portions of the housing cover, such as a lock pin or set of lock pins, which may protrude from a surface of the housing cover. The lock pin may be positioned in such a way as to inhibit removal of the ferrule from the BOA. For example, when the housing cover is in the closed position, the lock pin may be positioned adjacent to and/or interact with other component(s) of the BOA to inhibit removal of the ferrule from the BOA. Such positioning of the lock pin and/or interaction with other component(s) of the BOA may help to maintain a position of the ferrule such that the ferrule may not be removed from the BOA.

In these or other embodiments described in this disclosure, the other component(s) of the BOA may include a spring clip. The spring clip may be coupled to the housing and may be positioned at least partially within the cavity of the BOA. The spring clip may be sized and shaped to allow insertion and removal of the ferrule from the cavity.

In some embodiments, the spring clip may include a receptacle portion and a bottleneck portion. The bottleneck portion may be a portion of the spring clip that may interact with both the ferrule and the lock pin of the housing cover. For example, when the housing cover is in the open position, the ferrule may be inserted through a flexible bottleneck opening of the bottleneck portion. The flexible bottleneck opening may flex or expand outwards to accommodate insertion of the ferrule into the receptacle portion where the lens may be positioned. Additionally or alternatively, the flexible bottleneck opening may help to guide insertion of the ferrule to result in a proper connection to the lens of the BOA.

In some embodiments, after the ferrule is fully inserted past the flexible bottleneck opening and into the receptacle portion of the spring clip, the flexible bottleneck opening may de-flex, retract inward, or otherwise return to its pre-flexed configuration so as to abut a rear portion of the ferrule. The abutment against the rear portion of the ferrule may apply a spring force to the ferrule so as to bias the ferrule against the lens of the BOA. Additionally or alternatively, in response to the ferrule being inserted past the flexible bottleneck opening and into the receptacle portion of the spring clip, the ferrule may be connected to the lens of the BOA. When the ferrule is connected to the lens, the ferrule can be removed or disconnected from the BOA so long as the flexible bottleneck opening may again flex or expand outward to allow withdrawal of the ferrule.

In some embodiments, the flexible bottleneck opening may flex or expand outward when the housing cover is in the open position. Thus, while the housing cover is in the open position, the ferrule may be inserted into the flexible bottleneck opening and into the receptacle portion of the spring clip to be inserted into the lens. The ferrule may also be withdrawn from the lens at will when the housing cover is in the open position such that the flexible bottleneck opening of the spring clip may flex or expand outward during withdrawal of the ferrule.

In some embodiments, the flexible bottleneck opening may not flex or expand outward when the housing cover is in the closed position. For instance, the lock pin of the housing cover may block or otherwise interact with the flexible bottleneck opening when the housing cover is in the closed position to prevent or at least inhibit insertion or removal of the ferrule. Thus, while the housing cover is in the closed position, the ferrule may not be inserted into the bottleneck opening nor be removed from the lens if already inserted. The reduced ability of the flexible bottleneck opening of the spring clip to flex or expand outward may be a result of the lock pin of the housing cover cooperating with the spring clip at the bottleneck portion. For example, the lock pin of the housing cover while in the closed position may be positioned adjacent to the bottleneck portion of the spring clip to inhibit flexion of the flexible bottleneck opening and thereby disallow sufficient berth for the ferrule to pass. In this manner, the closed position of the housing cover may result in the flexible bottleneck opening being substantially fixed in its position and the connection between the ferrule and the lens of the BOA being secured.

Turning to the figures, FIG. 1 illustrates an example ferrule 105 and BOA 110, arranged in accordance with at least one embodiment described herein. The ferrule 105 and the BOA 110 may be implemented in an example operating environment 100 (hereinafter "environment 100").

In some embodiments, the environment 100 may be part of a host connection to an optical network. For example, the ferrule 105 may include or be coupled to one or more optical fibers 106 configured for transmitting optical signals within the optical network. The ferrule 105 may be securely connected to the BOA 110, which may be employed in transmitting and/or receiving communication signals between a host and the optical network, including converting outbound electrical signals from the host to optical signals for transmission onto the optical network and/or converting inbound optical signals from the optical network to electrical signals for the host. For instance, in some embodiments, inbound optical signals transmitted through the ferrule 105 may proceed into a lens of the BOA 110 via a secure connection between the ferrule 105 and the BOA 110. Similarly, outbound optical signals may be transmitted from the BOA 110 through the lens and to the ferrule 105 through the secure connection between the ferrule 105 and the BOA 110. The secure connection between the ferrule 105 and the BOA 110 as illustrated in FIG. 1 may be realized in accordance with at least one or more embodiments discussed further below.

One or more embodiments of the secure connection, latch, and/or retention mechanism(s) (e.g., including a movable cover and spring clip) described herein may be implemented in BOAs such as the BOA 110 of FIG. 1. More generally, one or more embodiments of the secure connection, latch, and/or retention mechanism(s) may be implemented in BOAs, Chip On Flex (COF)-based optoelectronic modules, Chip On Board (COB)-based optoelectronic modules, Chip on Glass (COG)-based optoelectronic modules, Active Optical Cable (AOC) systems or modules, quad small form factor pluggable (QSFP)-compliant optoelectronic modules, and/or in other optical, optoelectronic, or electronic modules that comply with other multisource agreements (MSA).

In some embodiments, the BOA 110 may include a cover 220, described in more detail with respect to other Figures.

Figure 2A:
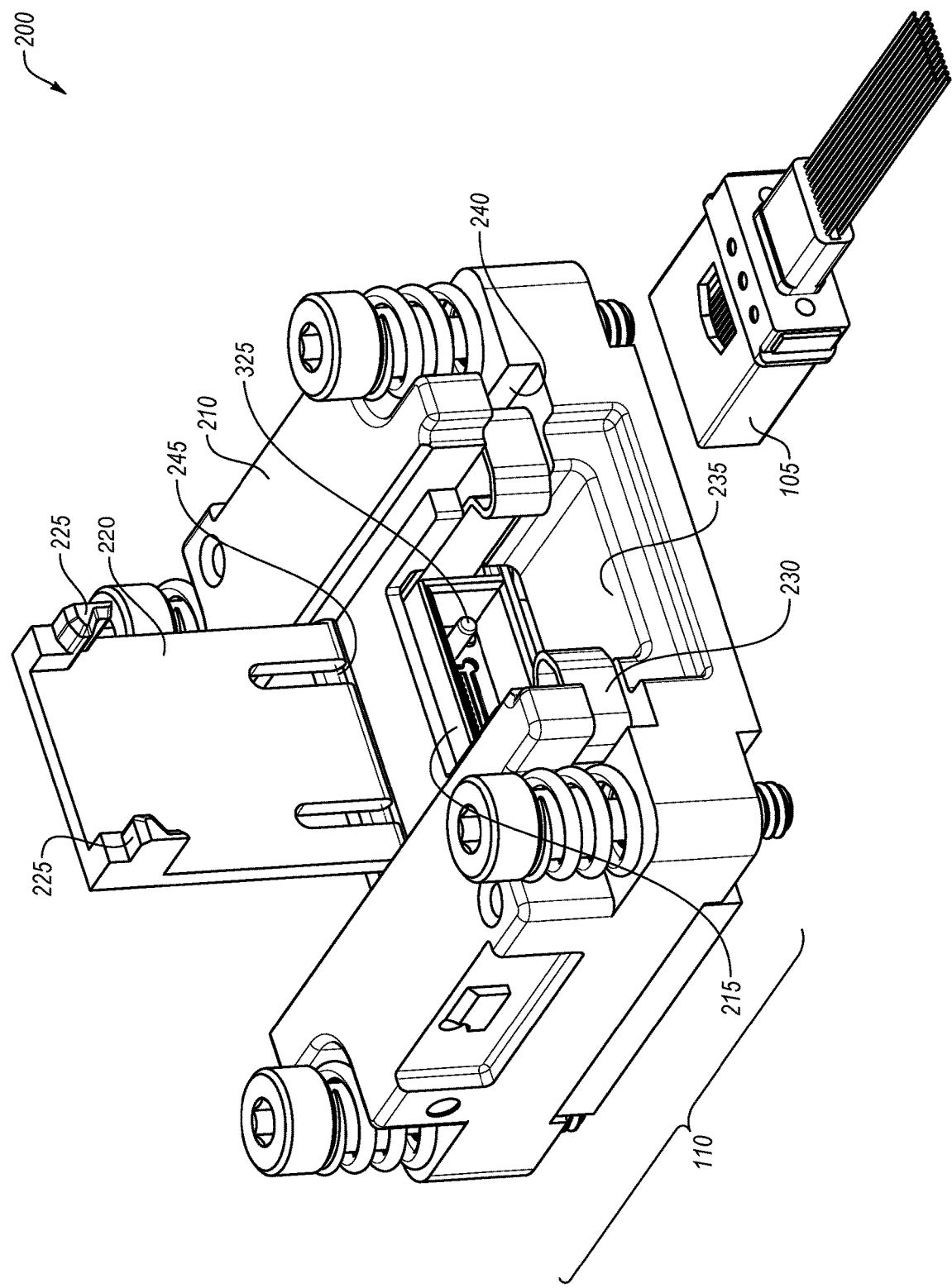
FIG. 2A illustrates the ferrule and BOA of FIG. 1 with the ferrule removed from the BOA and the movable cover in an open position.
Figure 2B:
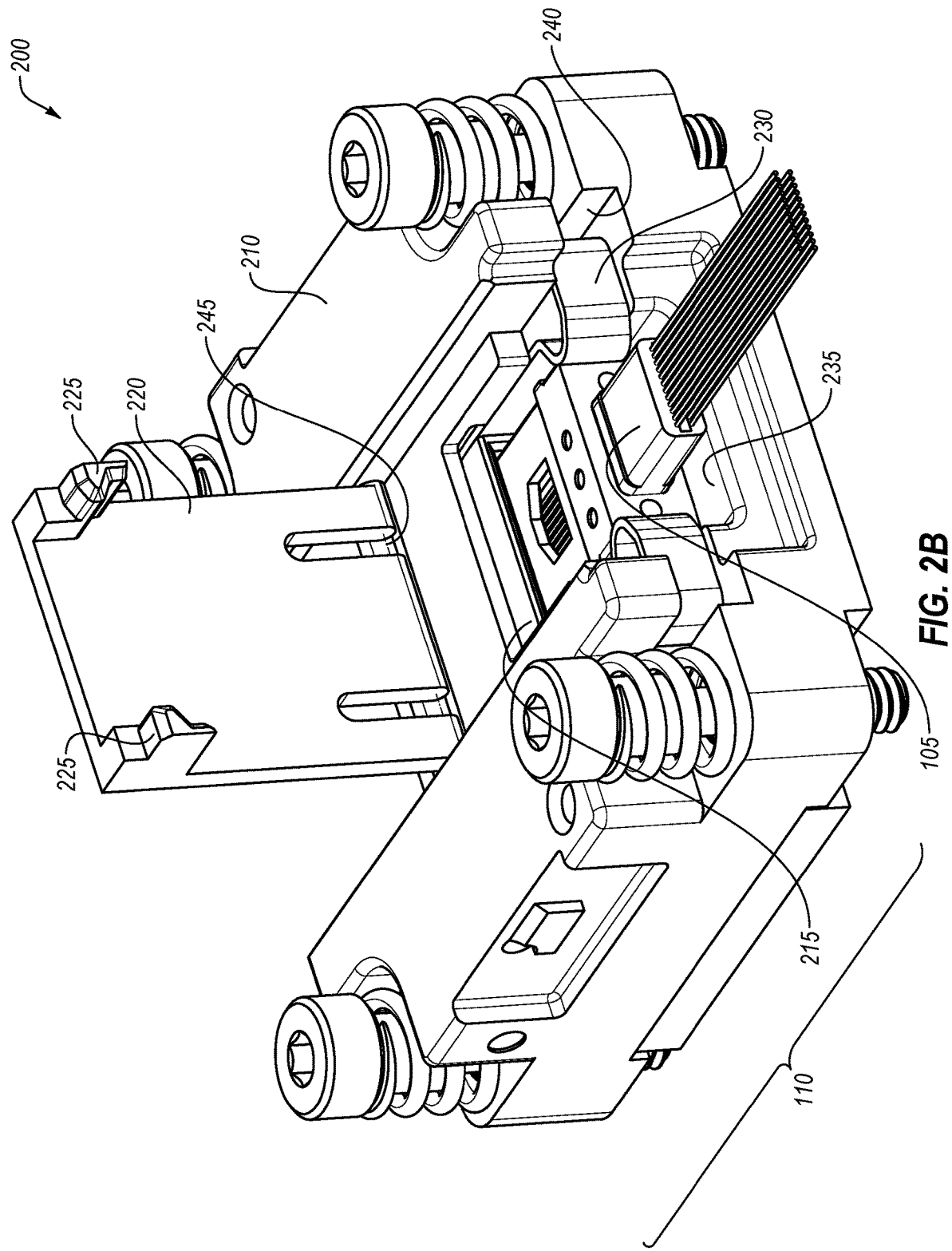
FIG. 2B illustrates the ferrule and BOA of FIG. 1 with the ferrule inserted into the BOA and the movable cover in the open position.

FIGS. 2A-2B illustrate the ferrule 105 and the BOA 110 of FIG. 1 with the cover 220 in an open position, arranged in accordance with at least one embodiment described herein. In FIG. 2A, the ferrule 105 is illustrated removed from the BOA 110. In FIG. 2B, the ferrule 105 is illustrated inserted into the BOA 110 but without the connection between the BOA 110 and the ferrule 105 being secured.

As illustrated in one or both of FIGS. 2A and 2B, the BOA 110 may include a housing 210, a lens 215, a spring clip 230, a cavity 235, and the cover 220. In some embodiments, the housing 210 may define metes and bounds of the cavity 235. For example, the metes and bounds of the cavity 235 as defined by the housing 210 may be sized and shaped to at least partially receive therein the ferrule 105. Additionally or alternatively, the lens 215 may be positioned at least partially within or internal relative to the housing 210. In these or other embodiments, the lens 215 may be positioned at least partially within the cavity 235. For example, the lens 215 may be positioned in a back portion of the cavity 235 relative to a front portion of the cavity 235 where the ferrule 105 may be inserted into the cavity 235. In some embodiments, the cavity 235 may be spatially configured to receive the ferrule 105 such that the ferrule 105 may be inserted a sufficient distance into the cavity 235 so as to connect to the lens 215 at the back portion of the cavity 235. Additionally or alternatively, the cavity 235 may be spatially configured such that upon insertion of the ferrule 105, a portion of the spring clip 230 may abut a rear portion of the ferrule 105 at the front portion of the cavity 235.

In some embodiments, the cavity 235 and various components of the BOA 110 may be visible and/or exposed without obstruction or with relatively less obstruction when the cover 220 is in the open position of FIGS. 2A and 2B. For example, when the cover 220 is in the open position of FIGS. 2A and 2B, the front portion of the cavity 235 and the back portion of the cavity 235 may be exposed and/or visible. At least a portion of the lens 215 may also be visible and/or exposed while the cover 220 is in the open position. Additionally or alternatively, one or more male guide pins 325 of the lens 215 may be visible and/or exposed when the cover 220 is in the open position. The one or more male guide pins 325, which may be visible and/or exposed while the cover 220 is in the open position, may correspond to one or more female openings in the ferrule 105. Thus, visual alignment of the lens 215 and the ferrule 105 may be achieved prior to the lens 215 and the ferrule 105 being connected or mated. Additionally or alternatively, lateral arms of opposing sides of the spring clip 230 may be visible and/or exposed while the cover 220 is in the open position.

In some embodiments, when the cover 220 is in a closed position as illustrated in FIG. 1, the cavity 235 and various components of the BOA 110 may not be substantially visible or may be generally unexposed or covered. For example, when the cover 220 is in the closed position as illustrated in FIG. 1, the front portion of the cavity 235 and the back portion of the cavity 235 may not be substantially visible, may be generally unexposed, and/or may be covered, particularly if the ferrule 105 is connected to the BOA 110. Rather, in the closed position, a top surface of the cover 220, which is opposite a bottom surface of the cover 220 that includes lock pins 225, may substantially obstruct visibility of the cavity 235 and various components of the BOA 110. For example, at least a portion of the lens 215 may not be visible and/or exposed while the cover 220 is in the closed position. Additionally or alternatively, the one or more male guide pins 325 of the lens 215 may not be visible and/or exposed when the cover 220 is in the closed position. Thus, when the cover 220 is in the closed position, visual alignment of the lens 215 and the ferrule 105 may be difficult or impossible to achieve. Additionally or alternatively, lateral arms of opposing sides of the spring clip 230 may not be visible and/or exposed while the cover 220 is in the closed position.

The cover 220 and its corresponding positions, including the open position and the closed position, may facilitate visibility or a lack thereof of the cavity 235 and various components of the BOA 110.

In some embodiments, the cover 220 may be movably coupled to the housing 210 of the BOA 110 such that the cover 220 may move to and from the open position and the closed position. In other embodiments, the cover 220 may be removable from the housing 210 while being coupleable to the housing 210 in a fixed manner, in which case the open position may involve the cover 220 being removed from the housing 210 and the closed position may involve the cover 220 being coupled to the housing 210.

As discussed above, the open position may be defined by the cover 220 being positioned in such a way as to not generally obstruct visibility of the cavity 235 and/or so as to expose the cavity 235. Additionally or alternatively, the open position may be defined by the cover 220 being positioned so as to allow for insertion and/or removal of the ferrule 105 into/from the lens 215. As also discussed above, the closed position may be defined by the cover 220 being positioned in such a way as to obstruct some visibility of the cavity 235 and/or to cover the cavity 235. Additionally or alternatively, the closed position may be defined by the cover 220 being positioned so as to disallow or to inhibit the insertion and/or removal of the ferrule 105 into/from the lens 215. As a result, the cover 220 may be configured to move or change between the open position and the closed position as may be desirable for a given application or function.

For example, the cover 220 may be rotatably coupled to the housing 210. For instance, the cover 220 may rotate about a fixed point or a fixed axis of rotation 245 connected to the housing 210. The fixed point or the fixed axis of rotation 245 may include a ball-and-socket, a pin hinge, a partial pin hinge, a pin-and-recess, or some other mode of coupling allowing for relative rotational movement of the cover 220. Additionally or alternatively, the fixed point or the fixed axis of rotation 245 may be positioned in a common plane with a top surface of the housing 210 or positioned in a plane substantially parallel to the top surface of the housing 210. The top surface of the housing 210 may define a plane that is substantially parallel to a direction in which the ferrule 105 may be inserted into the BOA 110. Thus, in some embodiments, when the cover 220 is rotated to the closed position, the cover 220 may also be positioned either in the common plane with the top surface of the housing 210 or in the plane substantially parallel to the top surface of the housing 210. In this manner, the cover 220 may substantially obstruct visibility to the cavity 235 and at least some other components of the BOA 110 or may otherwise at least partially cover the cavity 235 and at least some other components of the BOA.

Additionally or alternatively, when the cover 220 is rotated or otherwise moved to the open position, the cover 220 may not be positioned in either of the common plane with the top surface of the housing 210 or the plane substantially parallel to the top surface of the housing 210. For example, when the cover 220 is in the open position, the cover 220 may be oriented in a direction that is angled relative to the top surface of the housing 210 such that the cover 220 does not substantially obstruct visibility to the cavity 235 and at least some other components of the BOA 110. In some embodiments, in the open position the angle of the cover 220 relative to the top surface of the housing 210 may be equal to or between 60° and 70°, 70° and 80°, 80° and 90°, 90° and 100°, 100° and 110°, 110° and 120°, 120° and 130°, 130° and 140°, 140° and 150°, 150° and 160°, and 160° and 170°.

In other embodiments, the cover 220 may be rotated to the open position such that the cover 220 may be positioned in either of the common plane with the top surface of the housing 210 or the plane substantially parallel to the top surface of the housing 210. For example, when the cover 220 is in the open position, the cover 220 may be oriented such that the cover 220 is about 180° relative to the top surface of the housing 210. In this manner, the cover 220 may be effectively flipped to the open position about the fixed point or the fixed axis of rotation 245. Additionally or alternatively, a portion of the top surface of the cover 220 may rest upon and/or face the top surface of the housing 210 when the cover 220 is flipped open to the approximate position of 180°.

In these or other embodiments, the cover 220 may rotate to any position between the open position and the closed position. For example, the cover 220 may be rotated upwards and angled only slightly relative to the top surface of the housing 210 (e.g., about 60°, about 50°, about 40°, about 30°, about 20°, or about 10°). In this manner, full visibility of the cavity 235 may not be achieved, but as will be described in further detail below, the cover 220 may nonetheless be opened a sufficient amount to at least partially expose the cavity 235 and to allow for insertion and/or removal of the ferrule 105 into/from the lens 215.

In some embodiments, the cover 220 may be slidably coupled to the housing 210. For example, the cover 220 may translate between the open position and the closed position. Thus, in some embodiments, the cover 220 may be positionally fixed to reside in either the common plane with the top surface of the housing 210 or the plane substantially parallel to the top surface of the housing 210, regardless of the cover 220 being in the open position, the closed position, or some position therebetween. For example, the top surface of the cover 220 and the bottom surface of the cover 220 may maintain their orientation relative to the top surface of the housing 210. However, the cover 220 moving to and from the open position and the closed position may correspond to translation of the cover 220 in its entirety relative to the housing 210.

In some embodiments, the cover 220 may be coupled to the housing 210 via a combination of the slidable coupling and the rotatable coupling discussed above. For example, the fixed point or the fixed axis of rotation 245 may only be fixed at certain positions or may not be positionally fixed at all. For instance, the fixed point or the fixed axis of rotation 245 may slide or translate at various positions and may thereby also be a movable point of rotation or a movable axis of rotation.

The cover 220 may be movably coupled to the housing 210 and thereby transition to and from the open position and the closed position. In so doing, visibility and/or exposure of the cavity 235 and one or more components of the BOA 110 may be affected. Additionally, and as further discussed below, the cover 220 moving to and from the open position and the closed position may also affect the connection between the ferrule 105 and the BOA 110.

In more detail, the lock pins 225 of the cover 220 may cooperate with one or more other components to provide a secure connection between the ferrule 105 and the BOA 110. Specifically, after the ferrule 105 is inserted into the lens 215 (as depicted by way of example in FIG. 2B), the cover 220 may be ready to close and thereby secure the connection via the lock pins 225. The lock pins 225 may extend outward from a surface of the cover 220, for example, the bottom surface of the cover 220. Additionally or alternatively, the lock pins 225 may extend outward from the surface of the cover 220 in a substantially perpendicular manner. Thus, in some embodiments, when the cover 220 is in the closed position, the lock pins 225 may extend downward from the surface of the cover and towards a bottom surface of the housing 210 opposite the top surface of the housing 210. The bottom surface of the housing 210 may also reside in a plane that is substantially parallel to the direction in which the ferrule 105 may be inserted into and removed from the BOA 110.

In some embodiments, when the cover 220 is in the open position, the lock pins 225 may not be positioned adjacent the spring clip 230, and the connection between the ferrule 105 and the lens 215 may be unsecure. For example, the spring clip 230 may be free to flex or expand outward in response to insertion or withdrawal of the ferrule 105 into/from the lens 215. Portions of the ferrule 105, including a ferrule head with a front portion configured for insertion into the lens 215 and a rear portion configured to be abutted by the spring clip 230, may both have a greater size dimension than that of the spring clip 230 at a bottleneck opening of the spring clip 230 when the spring clip 230 is unflexed. Thus, in some embodiments, for the ferrule head of the ferrule 105 to pass through the bottleneck opening of the spring clip 230, the spring clip 230 may flex or expand outward.

Such outward flexion may be possible when the lock pins 225 are not positioned adjacent the spring clip 230 (e.g., when the cover 220 is in the open position). For example, the housing 210 may include a recess or flex groove 240 in which the spring clip 230 may flex outward and into the recess or flex groove 240 of the housing 210. Thus, in some embodiments, the housing 210 may remain fixed and a portion of the spring clip 230 (e.g., a bottleneck opening of the spring clip 230) may, in a sliding motion, flex into the recess or flex groove 240 of the housing 210 in response to the ferrule 105 passing through the bottleneck opening of the spring clip 230 until a rear of the ferrule 105 clears the bottleneck opening of the spring clip 230 such that the bottleneck opening at least partially unflexes or otherwise at least partially returns to its initial unexpanded/unflexed state. Similarly, in response to the ferrule 105 being removed from the cavity 235 and the spring clip 230, the bottleneck opening of the spring clip 230 may flex into the recess or flex groove 240 of the housing 210 until a front of the ferrule 105 clears the bottleneck opening of the spring clip 230 such that the bottle neck opening unflexes or otherwise returns to its initial unexpanded/unflexed state.

When the cover 220 is in the closed position, the lock pins 225 may be positioned adjacent the spring clip 230, and the lock pins 225 may cooperate with the spring clip 230 to secure the connection between the ferrule 105 and the lens 215 (or prevent insertion of the ferrule 105). For example, in the closed position, the lock pins 225 may be positioned in a space laterally between the spring clip 230 and a portion of the housing 210. When the cover 220 is in the open position, the space may be empty, thereby permitting the bottleneck opening of the spring clip 230 to flex into the space and/or the recess or flex groove 240. In this manner, the lock pins 225 in cooperation with the housing 210 and the spring clip 230 may disallow or inhibit the removal and/or insertion of the ferrule 105 into/from the lens 215 or more generally the BOA 110. For instance, the lock pins 225 may function as a mechanical stop such that the spring clip 230 may not pass, slide, or flex into the recess or flex groove 240 of the housing 210. In the case of attempted insertion or removal of the ferrule 105, whether intentional or inadvertent, the spring clip 230 may not be able to flex outward at all due to engagement with the lock pins 225, or may begin to flex outward, but may then hit against a lower portion of each of the lock pins 225. The lower portion of each of the lock pins 225 may be at an opposing end of an upper portion at each of the lock pins 225, where the upper portion may be connected to the cover 220 and may also be supported when abutted by the portion of the housing 210. In this manner, the bottleneck opening of the spring clip 230 may be inhibited from flexing outward to accommodate insertion or removal of the ferrule 105 when the cover 220 is in the closed position.

Figure 3A:
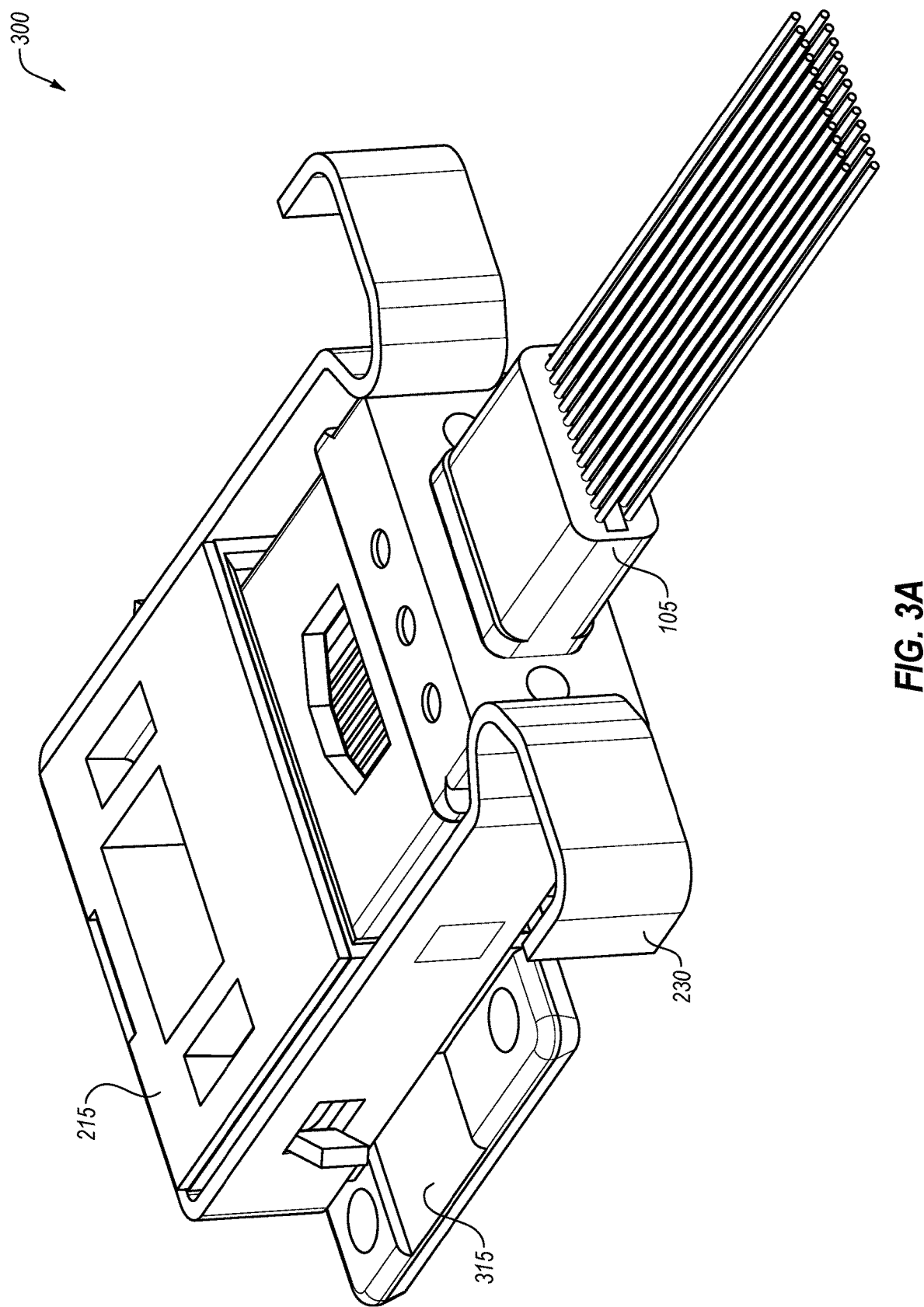
FIG. 3A is an upper front perspective view of the ferrule mated with a lens and retained in place by a spring clip of the BOA of FIG. 1.
Figure 3B:
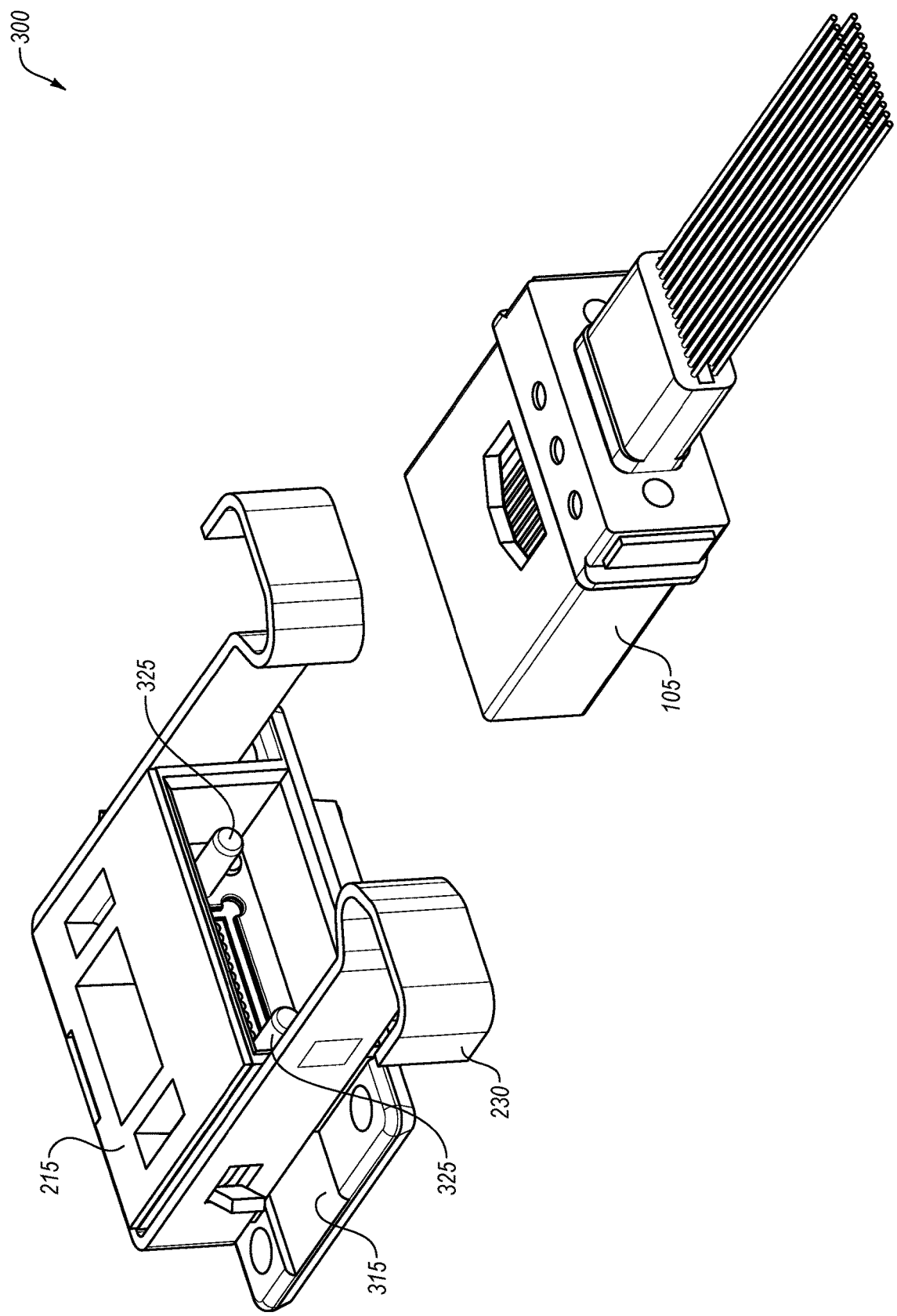
FIG. 3B is an upper front perspective view of the ferrule, lens, and spring clip of FIG. 3A with the ferrule disconnected from the lens.
Figure 3D:
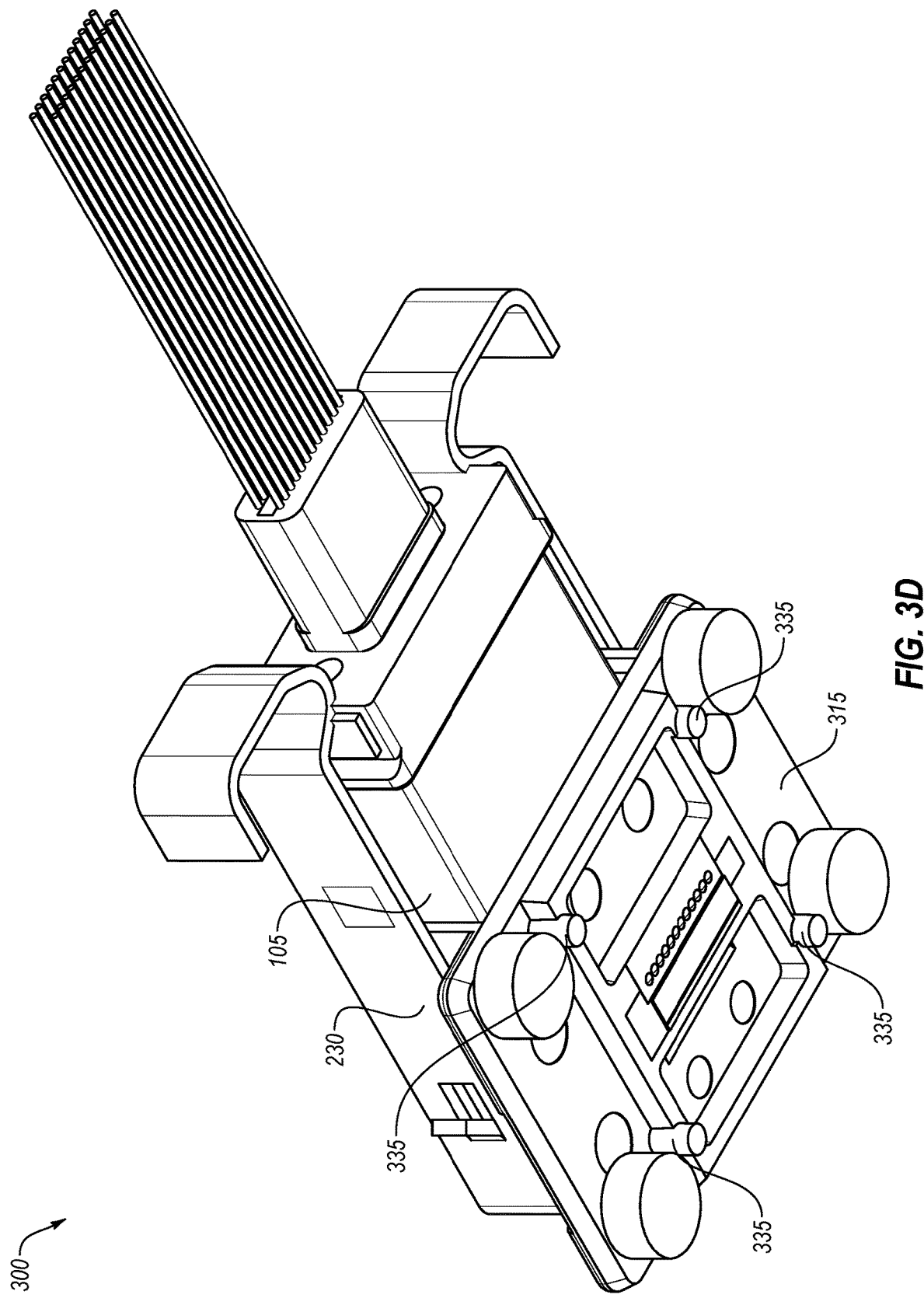
FIG. 3D is a lower front perspective view of the ferrule, lens, and spring clip of FIG. 3A.

FIG. 3A is an upper front perspective view of the ferrule 105 mated with the lens 215 and retained in place by the spring clip 230 of the BOA 110 of FIG. 1, arranged in accordance with at least one embodiment described herein. FIG. 3B is an upper front perspective view of the ferrule 105, lens 215, and spring clip 230 of FIG. 3A with the ferrule 105 disconnected from the lens 215, arranged in accordance with at least one embodiment described herein. FIG. 3C is an upper rear perspective view of the ferrule 105, lens 215, and spring clip 230 of FIG. 3B, arranged in accordance with at least one embodiment described herein. FIG. 3D is a lower front perspective view of the ferrule 105, lens 215, and spring clip 230 of FIG. 3A, arranged in accordance with at least one embodiment described herein.

FIG. 3B additionally illustrates male guide pins 325 of the lens 215. FIG. 3C additionally illustrates female openings 330 of the ferrule 105 that may correspond to and/or receive the male guide pins 325. FIG. 3D additionally illustrates lens feet 335 of the lens 215.

With ongoing reference to one or more of FIGS. 3A-3D, in some embodiments, the lens 215 may be at least partially positioned within and/or at least partially surrounded by the spring clip 230, in particular, within a receptacle portion of the spring clip 230. The receptacle portion of the spring clip 230 may be sized and shaped to at least partially enclose the lens 215. For example, the lens 215 may be positioned at a back portion of the receptacle portion, where the back portion is opposite of a front portion or the bottleneck portion of the spring clip 230. Additionally or alternatively, the spring clip 230 may be sized and shaped to receive the ferrule 105 through the flexible bottleneck opening at the bottleneck portion of the spring clip 230. After passage through the flexible bottleneck opening, the ferrule 105 may continue insertion into the back portion of the receptacle portion of the spring clip 230.

After insertion of the ferrule 105 past the flexible bottleneck opening and into the receptacle portion of the spring clip 230, the ferrule 105 may achieve insertion into the lens 215. After insertion of the ferrule 105 into the lens 215, the bottleneck portion of the spring clip 230 may be positioned to abut the ferrule 105. For example, a rear portion of the ferrule 105, opposite a front portion of the ferrule 105 inserted into the lens 215, may be in direct contact with the spring clip 230 and specifically with the bottleneck opening of the spring clip 230. The abutment of the bottleneck portion against the ferrule 105 may bias the ferrule 105 against the lens 215.

In some embodiments, the bias that may be provided by the spring clip 230 may include resultant forces upon the ferrule 105 and/or the lens 215 that may approximately zero out. For example, spring forces may be transferred through various members of the spring clip 230 such that no force may be substantially unbalanced along the spring clip 230. For example, a rear of the spring clip 230 may be anchored against the rear of the lens 215 to pull, e.g., bias, the ferrule 105 against the lens 215 from the lens 215 itself. In comparison, if the spring clip 230 were anchored against the housing 210 (FIGS. 2A-2B) and pushed or otherwise biased the ferrule 105 against the lens 215 from the housing 210, this may apply a net force against the lens 215 that may then have to be cancelled out by the connections of other components (e.g., a connection of the lens feet 335 to the housing 210 or other component of the BOA) to keep the lens 215 in place.

In these or other embodiments, the spring forces may wrap around the spring clip 230, including around various geometrical configurations of the spring clip 230 that may help to provide a force-balancing effect upon the ferrule 105 and the lens 215. For example, were unbalanced forces provided to the ferrule 105 and the lens 215, other components in an optical assembly may, in turn, be subjected to the same or a reduced version of the unbalanced forces (perhaps resulting in unwanted effects of distortion or other inaccuracies and errors). For example, an unbalanced force could be transferred from the ferrule 105, to the lens 215, to a lens base 315 upon which the lens 215 may be connected, and so on and so forth in a chain-reaction type manner. However, for embodiments described in the present disclosure, the spring clip 230 may not subject other components in the optical assembly to unbalanced forces. For example, the lens feet 335 or the lens base 315 may not be subjected to unbalanced forces. Additionally or alternatively, the lens feet 335 and the lens base 315 may not be subjected to any forces.

In some embodiments, the spring clip 230 may function as a funnel or insertion guide such that the geometry of the spring clip 230 and/or the spring forces of the spring clip 230 may assist in connecting the ferrule 105 to the lens 215. For example, the male guide pins 325 of the lens 215 may correspond to the female openings 330 of the ferrule 105. Visual alignment of the male guide pins 325 with the female openings 330 may aid proper connection of the ferrule 105 to the lens 215. Additionally or alternatively, however, the geometry of the spring clip 230 and/or the spring forces of the spring clip 230 may help to align and/or course correct a trajectory of insertion of the ferrule 105. For example, a slightly skewed trajectory of insertion may be corrected by one or both rounded portions of a bottleneck opening in the spring clip 230 and/or by the balanced spring forces applied by the spring clip 230.

Figure 4A:
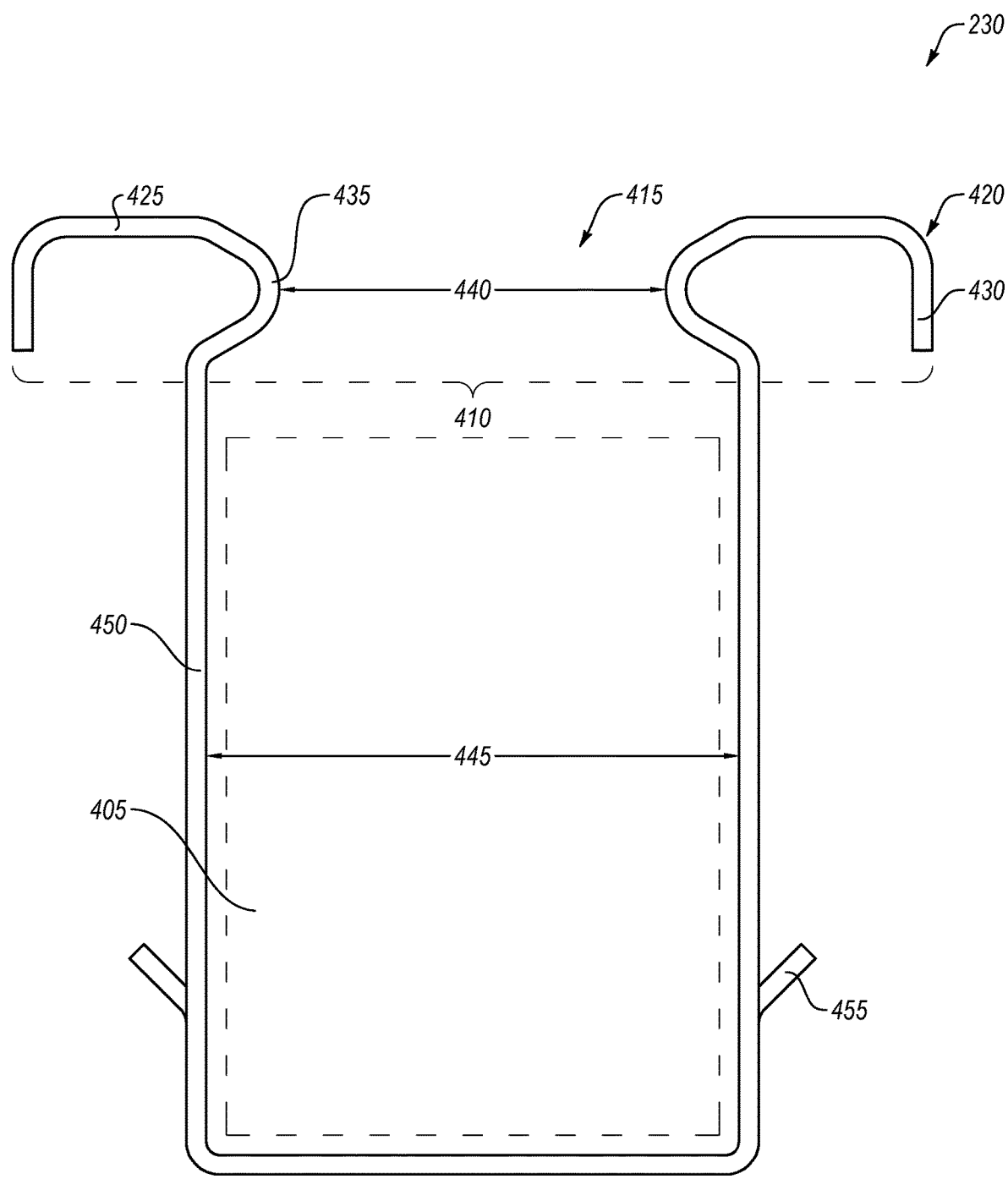
FIG. 4A is an overhead view of the spring clip of FIGS. 2A-3D.

FIG. 4A is an overhead view of the spring clip 230 of FIGS. 2A-2D, arranged in accordance with at least one embodiment described herein. As illustrated, the spring clip 230 includes a receptacle portion 405, a bottleneck portion 410, lateral arms 450, and retention tabs 455.

In some embodiments, the bottleneck portion 410 may include a flexible bottleneck opening 415, one or more elbow portions 420, and one or more rounded portions 435. The flexible bottleneck opening 415 may be an entrance way and exit way for the ferrule 105/105/105 of FIGS. 1-3D such that the ferrule 105 may enter and exit into the spring clip 230. For example, the ferrule 105 may pass through the flexible bottleneck opening 415 to connect to the lens 215 positioned in the receptacle portion 405. The ferrule 105 may also pass through the flexible bottleneck opening 415 to disconnect from the lens 215.

In some embodiments, the bottleneck opening 415 may be defined, at least in part, by a bottleneck-like geometry. For example, a bottleneck width 440 of the bottleneck opening 415 may be defined as the distance between the rounded portions 435, one positioned on each opposing side of the flexible bottleneck opening 415. The bottleneck width 440 may be dimensionally smaller than a receptacle width 445 of the receptacle portion 405, at least when the spring clip 230 is unflexed. To accommodate insertion and removal of the ferrule 105, the lateral arms 450 or other portions of the spring clip 230 may flex outward as the ferrule 105 is inserted or removed such that the bottleneck width 440 expands to the width of the ferrule 105 until the ferrule 105 clears the bottleneck opening 415. Thus, at least the bottleneck width 440 may fluctuate as the lateral arms 450 and/or other portions of the spring clip 230 flex and de-flex in response to insertion/removal of the ferrule 105. Such flexion may be due at least to the ferrule 105 having a greater width dimension than the bottleneck width 440 when the spring clip 230 is unflexed. For example, when the spring clip 230 is unflexed, the ferrule 105 may have a width dimension greater than the bottleneck width 440 but less than or equal to the receptacle width 445 of the receptacle portion 405 such that that ferrule may fit within the receptacle portion 405.

In some embodiments, the rounded portions 435 of the bottleneck portion 410 may be configured to abut the ferrule 105 after the ferrule 105 is inserted into the lens 215 and is positioned within the receptacle portion 405 of the spring clip 230. Additionally or alternatively, the rounded portions 435 may bias the ferrule 105 against the lens 215 after the ferrule 105 is inserted into the lens 215. For example, the rounded portions 435 may apply a spring force to the rear portion of the ferrule 105. The applied spring force upon the inserted ferrule 105 may be due to, e.g., the rear portion of the ferrule 105 fitting tight against the rounded portions 435 and/or the rear portion of the ferrule 105 causing some expansion or flexion in the bottleneck portion 410 such that bottleneck width 440 is wider than when the spring clip 230 is at rest (e.g., when the ferrule 105 is not inserted into the spring clip 230).

Additionally or alternatively, the spring force or the bias applied by the spring clip 230 may be balanced to equal approximately zero. For example, the spring force may be transferred along various members of the spring clip 230, including those which extend in various directions relative to each other. For instance, the spring force may transfer along the two opposing lateral arms 450 and along the rounded portion 435 and the elbow portion 420. In these or other embodiments, the forces wrapping around to effectively come full circle may work towards helping to provide a force-balancing effect on the lens 215 and the ferrule 105 when connected together.

In some embodiments, each of the rounded portions 435 connects to a different one of the two opposing lateral arms 450. The two opposing lateral arms 450 may define, at least in part, certain metes and bounds of the receptacle portion 405, including a length of the spring clip 230 and the receptacle width 445 sufficient to substantially enclose both the lens and the ferrule (when inserted). The receptacle portion 405 may be rectangular-like or square-like, as spatial requirements and spatial footprints of various components (e.g., the lens 215 and the ferrule 105) and/or the housing 210 may provide.

For example, the spring clip 230 may be sized and shaped to fit within the housing 210 and lock into place via retention tabs 455 of the spring clip 230. As the spring clip 230 is being positioned within the housing 210, the retention tabs 455 may be compressed while sliding against opposing sidewalls of the housing 210 that define the cavity 235. Then, at a certain point within the housing 210, the opposing sidewalls may include a corresponding feature to the retention tabs 455 such as a dimple, a flange, a wing, or opening to allow the retention tabs 455 to decompress and expand outward to a non-compressed state. After the retention tabs 455 have expanded out into the corresponding dimple, flange, wing, or opening of the opposing sidewalls of the housing 210, the retention tabs 455 may then lock the spring clip 230 into position relative to the housing 210, the decompressed retention tabs 455 being substantially unable to be removed due in part to the corresponding feature of the opposing sidewalls of the housing 210.

In some embodiments, the bottleneck portion 410 of the spring clip 230 includes the elbow portions 420, each positioned adjacent each of the opposing sides of the flexible bottleneck opening 415. Each of the elbow portions 420 may include a first portion 425 and a second portion 430. Each first portion 425 may be connected to a corresponding one of the rounded portions 435. Each second portion 430 may be connected to a corresponding one of the first portions 425 and may extend in a direction of the length of the receptacle portion 405 and/or in a direction substantially parallel to the lateral arms 450. In these or other embodiments, the bottleneck portion 410, including at least the elbow portions 420, may flex into and de-flex out of the recess or flex groove 240 of the housing 210 in response to insertion or withdrawal of the ferrule. For example, the housing 210 may remain fixed and the elbow portions 420 of the bottleneck portion 410 may, in a sliding motion, move into the recess or flex groove 240 of the housing 210 in response to the ferrule 105 passing through the flexible bottleneck opening 415 of the spring clip 230. Similarly, in response to the ferrule exiting or otherwise clearing the flexible bottleneck opening 415 of the spring clip 230, elbow portions 420 of the bottleneck portion 410 may, in a sliding motion, move out of the recess or flex groove 240 of the housing 210. Additionally or alternatively, when the lock pins 225 of the cover 220 are absent or otherwise not positioned adjacent and between the bottleneck portion 410 and the housing 210, each of the second portions 430 may function as a flex stop such that movement of the bottleneck portion 410 may substantially cease in response to the second portion 430 abutting an outer limit of the recess or flex groove 240 of the housing 210. In some embodiments, when the second portions 430 function as the flex stops, the second portions 430 may help to stop an attempt at connecting incompatible or incorrect ferrules with the BOA 110. For example, a ferrule sized too large for the BOA 110 may not fit within the flexible bottleneck opening 415, even when the second portions 430 of the bottleneck portion 410 are moved to the outer limit of the recess or flex grooves 240 of the housing, thereby helping to prevent error and/or component damage.

Figure 4B:
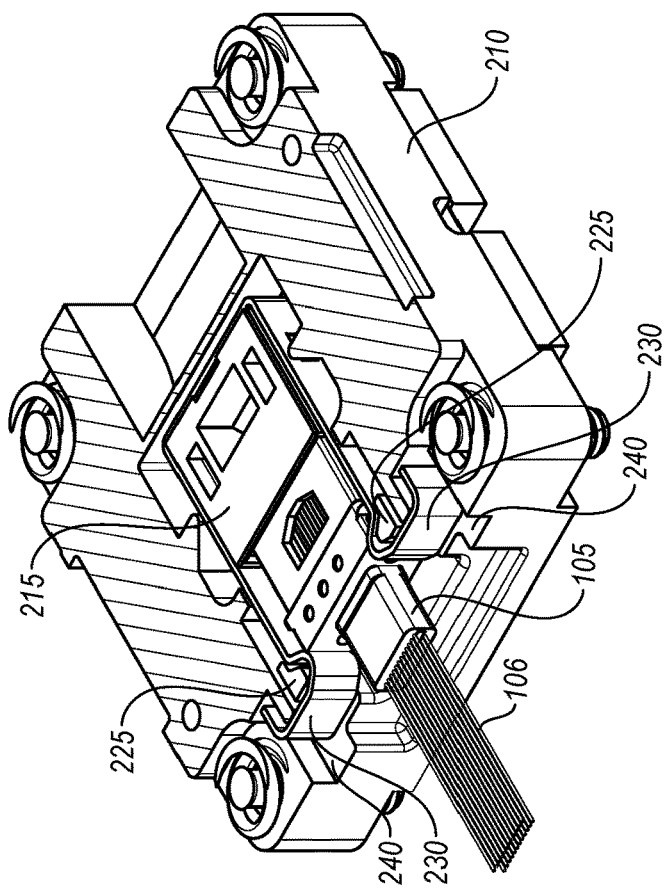
FIG. 4B includes an overhead cutaway view and an upper perspective cutaway view of the ferrule and BOA of FIG. 1.
Figure 4B:
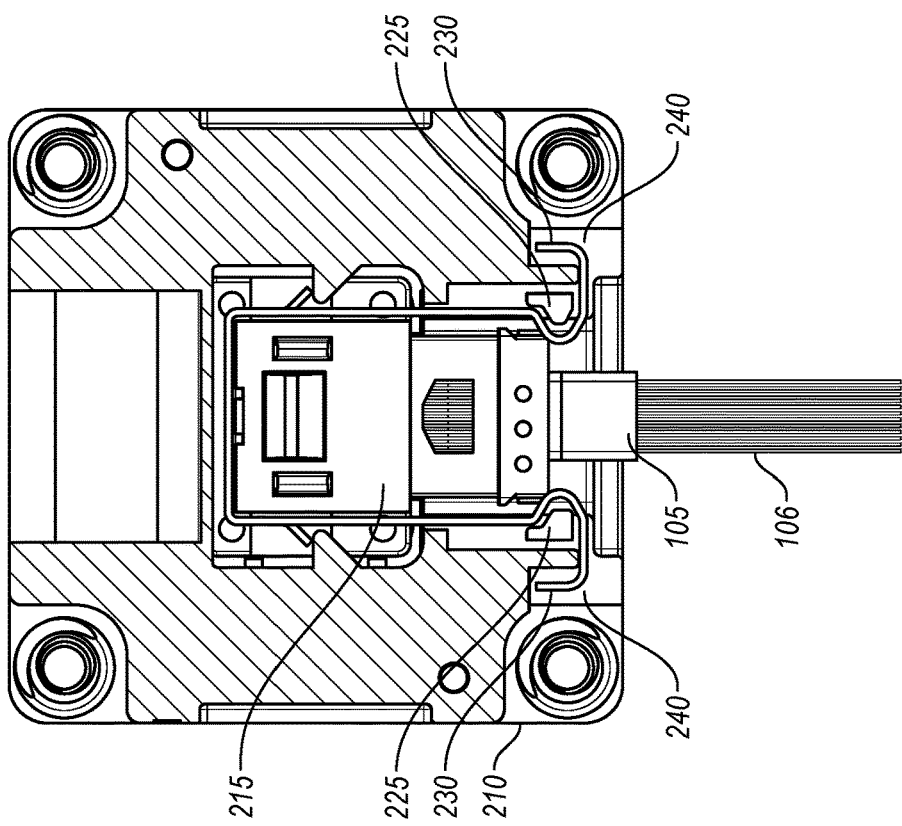
Figure 4C:
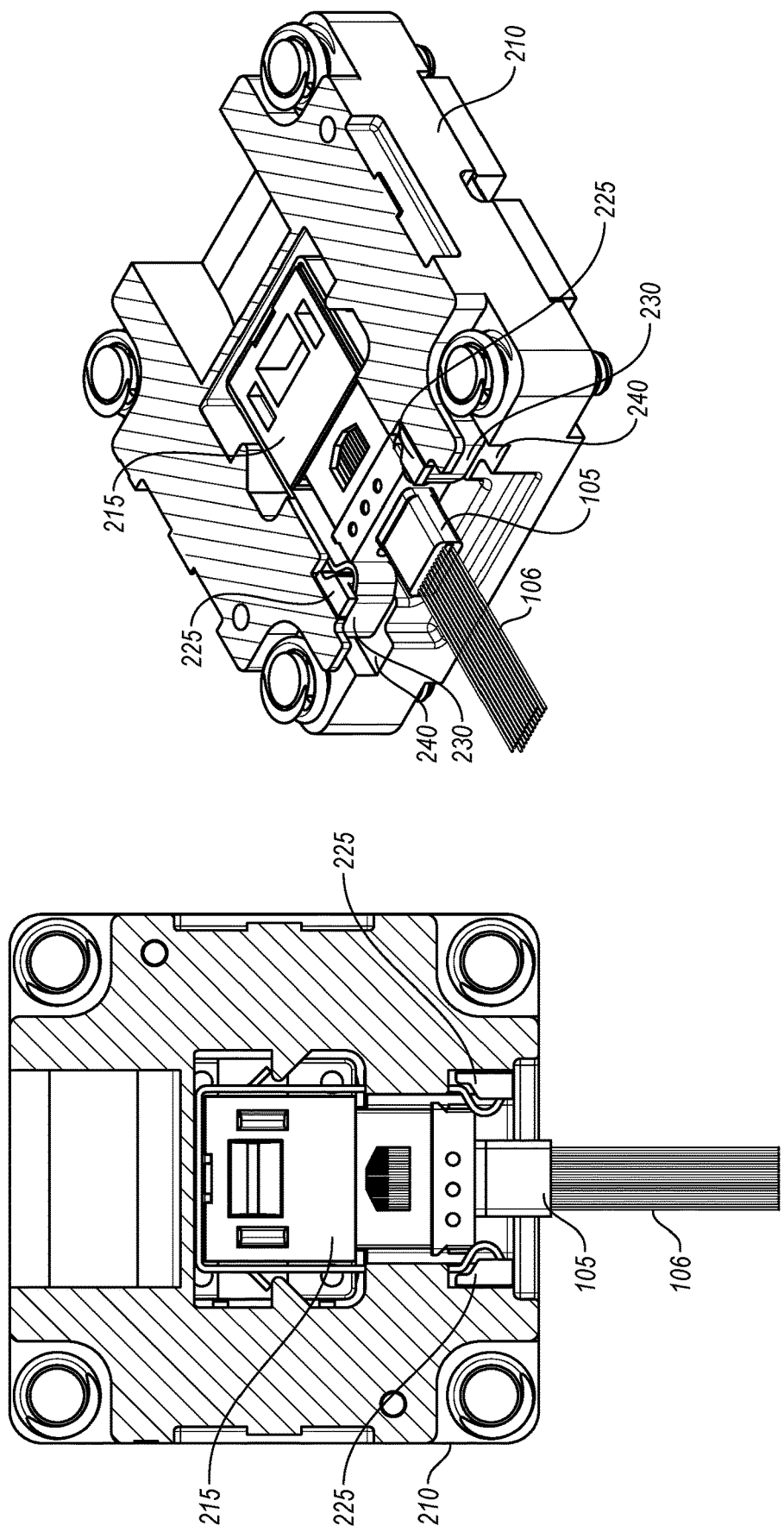
FIG. 4C includes another overhead cutaway view and another upper perspective cutaway view of the ferrule and BOA of FIG. 1.

FIG. 4B includes an overhead cutaway view and an upper perspective cutaway view of the ferrule 105 and the BOA 110 of FIG. 1, arranged in accordance with at least one embodiment described herein. FIG. 4C includes another overhead cutaway view and another upper perspective cutaway view of the ferrule 105 and the BOA 110 of FIG. 1, arranged in accordance with at least one embodiment described herein. As illustrated, FIGS. 4B-4C include the housing 210, the lens 215, the lock pins 225 of the cover 220, the spring clip 230, the flex groove 240, the ferrule 105, the optical fibers 106, and the lock pins 225 of the cover 220.

In more detail, the lock pins 225 of the cover 220 may cooperate with one or more other components to provide a secure connection between the ferrule 105 and the BOA 110. For example, when the cover 220 is in the closed position, the lock pins 225 may be positioned adjacent the spring clip 230, and the lock pins 225 may cooperate with the spring clip 230 to secure the connection between the ferrule 105 and the lens 215 (or prevent insertion of the ferrule 105). For example, in the closed position, the lock pins 225 may be positioned in a space laterally between the spring clip 230 and a portion of the housing 210. In this manner, the lock pins 225 in cooperation with the housing 210 and the spring clip 230 may disallow or inhibit the removal and/or insertion of the ferrule 105 into/from the lens 215 or more generally the BOA 110. For instance, the lock pins 225 may function as a mechanical stop such that the spring clip 230 may not pass, slide, or flex into the recess or flex groove 240 (not illustrated in FIG. 4B) of the housing 210. In the case of attempted insertion or removal of the ferrule 105, whether intentional or inadvertent, the spring clip 230 may not be able to flex outward at all due to engagement with the lock pins 225, or may begin to flex outward, but may then hit against a lower portion of each of the lock pins 225. The lower portion of each of the lock pins 225 is visible at least in FIGS. 2A, 2B, and 4B and may be at an opposing end of where the lock pins 225 extend away from the cover 220. Additionally, an upper portion of the lock pins 225 is illustrated in FIGS. 2A, 2B, and 4C and may be connected to the cover 220. The upper portion of the lock pins 225 may also be supported when abutted by the portion of the housing 210. In this manner, the bottleneck opening of the spring clip 230 may be inhibited from flexing outward to accommodate insertion or removal of the ferrule 105 when the cover 220 is in the closed position.

Figure 4D:
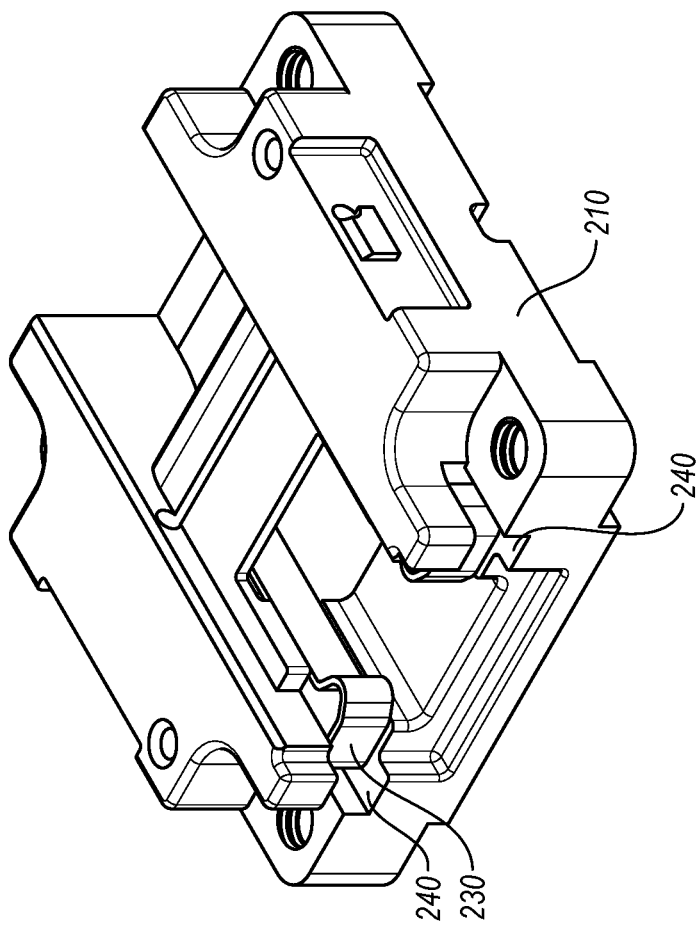
FIG. 4D includes an overhead view and an upper perspective view of FIGS. 1-2B without a lens, the ferrule, and the movable cover.
Figure 4D:
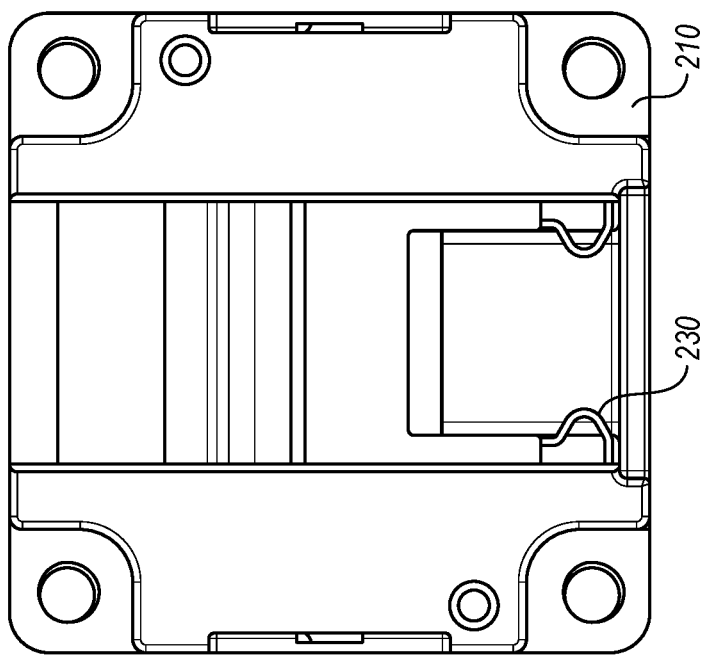

FIG. 4D includes an overhead view and an upper perspective view of FIGS. 1-2B without the lens 215, the ferrule 105, and the movable cover 120, arranged in accordance with at least one embodiment described herein. As illustrated, FIG. 4D includes the housing 210, the flex groove 240, and the spring clip 230 that is fully inserted into the housing 210. In these or other embodiments, various portions of the spring clip 230 may be more visible than others. For example, the elbow portions 420, the lateral arms 450, and the retention tabs 455 may be less visible than the rounded portions 435 that define the bottleneck width 440 when the spring clip 230 is fully inserted into the housing 210.

Figure 4E:
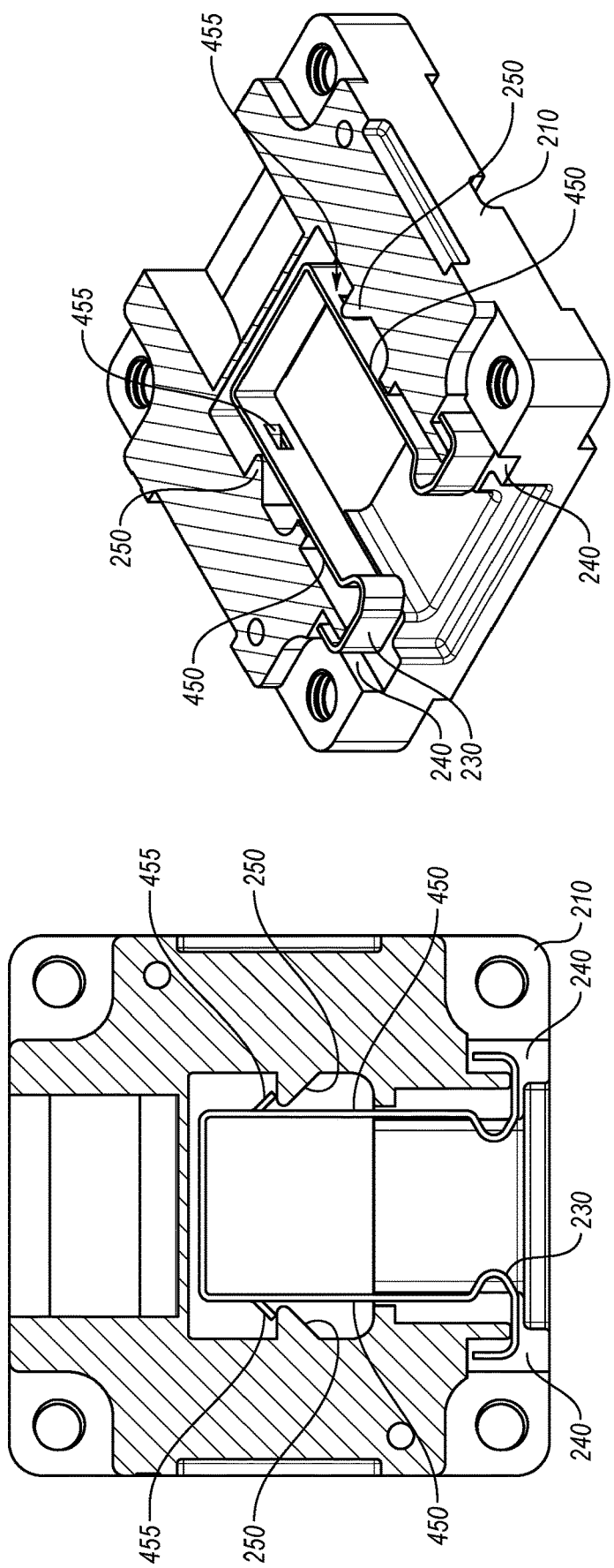
FIG. 4E includes an overhead cutaway view and an upper perspective cutaway view of FIG. 4D.

FIG. 4E includes an overhead cutaway view and an upper perspective cutaway view of FIG. 4D, arranged in accordance with at least one embodiment described herein. As illustrated, FIG. 4E includes the housing 210, the spring clip 230, the flex groove 240, and two retention elements 250. The retention elements 250 of the housing 210 may cooperate with the retention tabs 455 of the spring clip 230 to retain the spring clip 230 in the housing 210. After the spring clip 230 is fully inserted into the housing 210, the spring clip 230 may not be removed without bending and/or breaking one or both of the retention tabs 455. For example, each of the retention elements 250 may protrude inward towards the lateral arms 450 and may include two sides that meet at a vertex (rounded, pointed, or otherwise). One side (e.g., an entry side) of the retention element 250 may be ramped to promote insertion of the spring clip 230 such that the retention tabs 455 and/or the lateral arms 450 may resiliently flex inward when sliding past the entry side of the retention elements 250. For instance, the retention tabs 455 and/or the lateral arms 450 may flex inward more and more until clearing the vertex of each of the retention elements 250. After the retention tabs 455 are inserted along the entry side and past the vertex of each of the retention elements 250, the retention tabs 455 and/or the lateral arms 450 may unflex, e.g., expand outward. The second side of each of the retention elements 250 (e.g., a rearward facing side) may inhibit removal of the spring clip 230 due to the vertex and/or an angle of the rearward facing side of each of the retention elements 250 relative to the retention tabs 455 (e.g., after insertion of spring clip 230, the retention tabs 455 catch the retention elements 250 and the spring clip 230 may not be removed without force and/or damage to the retention tabs 455).

Figure 5:
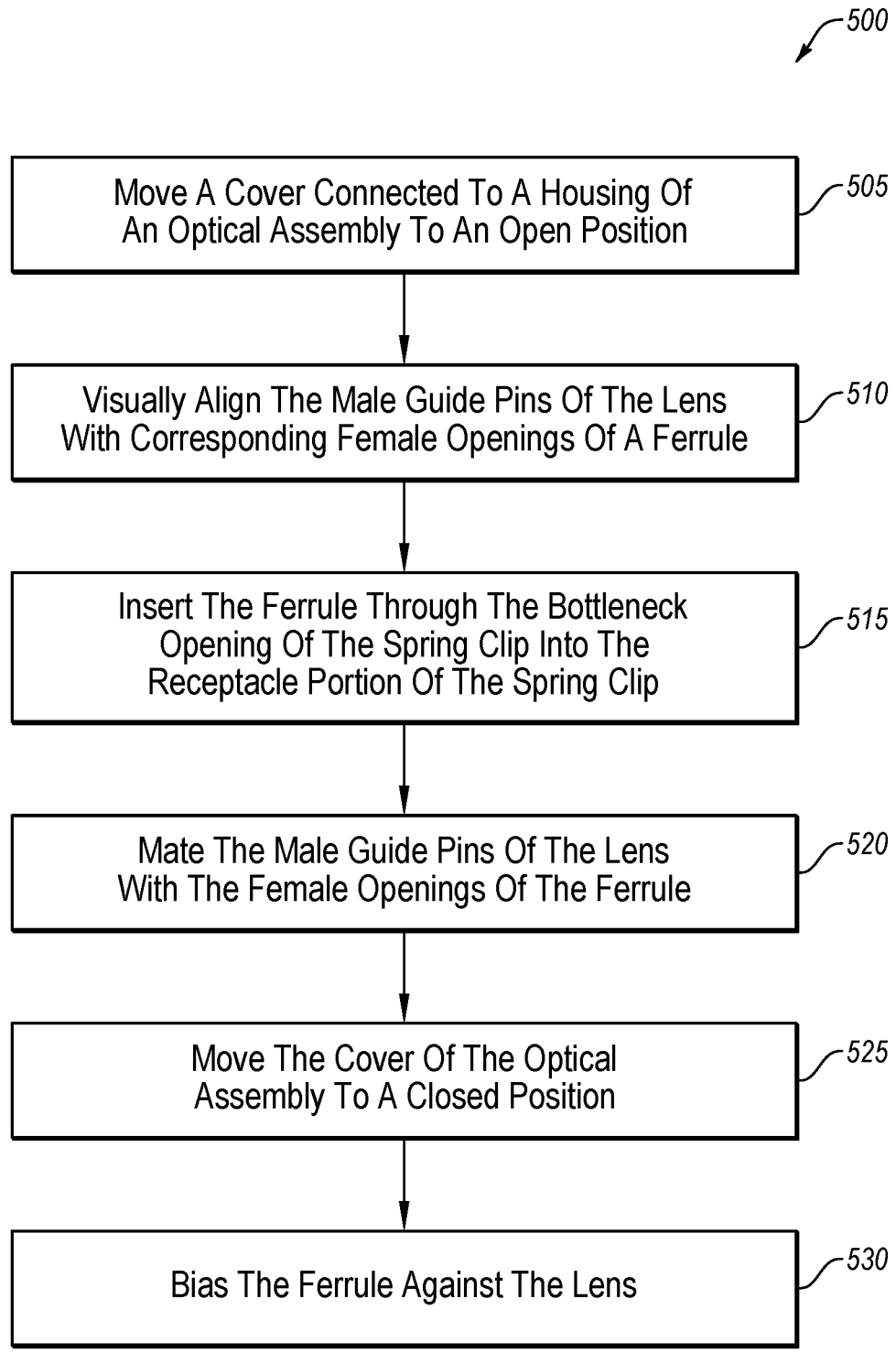
FIG. 5 is a flow diagram of an example method to provide a secure ferrule-to-lens connection, all arranged in accordance with at least one embodiment described herein.

FIG. 5 is a flow diagram of an example method 500 to provide a secure ferrule-to-lens connection, arranged in accordance with at least one embodiment described herein. The method 500 may be performed, in whole or in part, in an optical system that may include the BOA of FIGS. 1-2B or other optical (or optoelectronic) assembly. Although illustrated as discrete blocks, various blocks may be divided into additional blocks, combined into fewer blocks, or eliminated, depending on the desired implementation.

The method 500 may begin at block 505, where a cover connected to a housing of an optical assembly may be moved to an open position to expose male guide pins of a lens of the optical assembly. Additionally or alternatively, the male guide pins of the lens may be positioned within a receptacle portion of a spring clip of the optical assembly. In some embodiments, moving the cover to the open position may include rotating the cover and/or sliding the cover relative to the housing from a closed position to the open position. Block 505 may be followed by block 510.

In block 510, the male guide pins of the lens may be visually aligned with corresponding female openings of a ferrule. The male guide pins may be oriented in a direction facing a bottleneck opening in a bottleneck portion of the spring clip. Block 510 may be followed by block 515. Alternatively or additionally, blocks 510 and 515 may at least partially overlap in time.

In block 515, the ferrule may be inserted through the bottleneck opening of the spring clip into the receptacle portion of the spring clip. As the ferrule is inserted (or withdrawn) through the bottleneck opening of the spring clip, the spring clip may flex such that the bottleneck portion of the spring clip may move outward into a flex groove of the optical assembly. Block 515 may be followed by block 520.

In block 520, the male guide pins of the lens may be mated with the female openings of the ferrule, e.g., the male guide pins may be received into the female openings. The male guide pins may be completely mated with the female openings when the bottleneck portion of the spring clip abuts a rear portion of the ferrule opposite a front portion of the ferrule mated with the lens. Block 520 may be followed by block 525.

In block 525, the cover of the optical assembly may be moved to the closed position such that lock pins of the cover cooperate with the spring clip to inhibit removal of the ferrule from the lens of the optical assembly. For example, inhibiting removal of the ferrule may include inhibiting outward expansion of at least a portion of the spring clip via lock pins that extend downward from a bottom surface of the cover. Additionally or alternatively, inhibiting removal of the ferrule may include positioning the lock pins laterally between the bottleneck portion and the flex groove such that the bottleneck portion may not move into the flex groove. Block 525 may be followed by block 530.

In block 530, the ferrule may be biased against the lens. The ferruled may be biased against the lens by the bottleneck portion that abuts the rear portion of the ferrule applying a force against the rear portion of the ferrule that urges the ferrule towards the lens.

One skilled in the art will appreciate that, for these and other processes, operations, and methods described herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A ferrule-to-lens latch mechanism, comprising:
a cover movable with respect to a housing of an optical assembly between an open position in which a cavity defined by the housing is visible and a closed position in which the cavity is covered by the cover, a lens of the optical assembly at least partially positioned in the cavity and having one or more guide pins which are visible in the cavity when the cover is in the open position prior to mating a ferrule to the lens within the cavity; and
a spring clip coupled to the housing and positioned at least partially in the cavity, the spring clip configured to allow insertion and removal of the ferrule from the cavity when the cover is in the open position and configured to bias the ferrule against the lens when the ferrule is mated to the lens,
wherein when the ferrule is mated to the lens within the cavity and the cover is in the closed position, the cover is configured to cooperate with the spring clip to inhibit removal of the ferrule from the cavity.

2. The ferrule-to-lens latch mechanism of claim 1, wherein the cover is rotatably coupled to the housing.

3. The ferrule-to-lens latch mechanism of claim 1, further comprising a lock pin that extends downward from a surface of the cover when the cover is in the closed position, the lock pin configured to inhibit outward expansion of at least a portion of the spring clip.

4. The ferrule-to-lens latch mechanism of claim 3, wherein:
the lock pin is positioned in a space laterally between a portion of the housing and a bottleneck portion of the spring clip when the cover is in the closed position to inhibit outward flexion of the bottleneck portion; and
the space laterally between the portion of the housing and the bottleneck portion of the spring clip is empty when the cover is in the open position.

5. The ferrule-to-lens latch mechanism of claim 1, wherein the spring clip is sized and shaped to receive the ferrule through a flexible bottleneck opening at a bottleneck portion of the spring clip and into a receptacle portion of the spring clip, the bottleneck portion of the spring clip configured to flex into and de-flex out of a flex groove defined by the housing in response to the ferrule passing through the flexible bottleneck opening and in response to the ferrule exiting the flexible bottleneck opening, respectively.

6. The ferrule-to-lens latch mechanism of claim 5, wherein the bottleneck portion is positioned to abut the ferrule when the ferrule is inserted into the receptacle portion of the spring clip, the abutment of the bottleneck portion against the ferrule configured to bias the ferrule against the lens.

7. The ferrule-to-lens latch mechanism of claim 6, wherein:
the receptacle portion of the spring clip is rectangular and includes two opposing lateral arms extending a length of the receptacle portion; and
the bottleneck portion of the spring clip includes two rounded portions positioned on opposing sides of the flexible bottleneck opening which together define the flexible bottleneck opening, each rounded portion of the two rounded portions connected to a different one of the two opposing lateral arms of the receptacle portion, a bottleneck width between the two rounded portions being less than a distance between the two opposing lateral arms of the receptacle portion at least when the spring clip is unflexed.

8. The ferrule-to-lens latch mechanism of claim 7, wherein the bottleneck portion includes an elbow portion positioned adjacent to each opposing side of the flexible bottleneck opening, the elbow portion including a first portion connected to one of the two rounded portions and a second portion extending in a direction of the length of the receptacle portion, the second portion configured as a flex stop in response to the bottleneck portion flexing outward until the second portion abuts an outer limit of the flex groove when a lock pin extending from the cover is not positioned adjacent the bottleneck portion.

9. An optoelectronic system comprising:
an optical network;
a host connected to the optical network through one or more board mount optical assemblies (BOAs), each of the one or more BOAs including:
a housing configured to at least partially encase a lens;
a cover movable with respect to the housing of the BOA between an open position in which a cavity defined by the housing is visible and a closed position in which the cavity is covered by the cover, a lens of the optical assembly at least partially positioned in the cavity and having one or more guide pins which are visible in the cavity when the cover is in the open position prior to mating a ferrule to the lens within the cavity; and a spring clip coupled to the housing and positioned at least partially in the cavity, the spring clip configured to allow insertion and removal of the ferrule from the cavity when the cover is in the open position and configured to bias the ferrule against the lens when the ferrule is mated to the lens, wherein when the ferrule is mated to the lens within the cavity and the cover is in the closed position, the cover is configured to cooperate with the spring clip to inhibit removal of the ferrule from the cavity.

10. The optoelectronic system of claim 9, wherein the cover is rotatably coupled to the housing or slidably coupled to the housing.

11. The optoelectronic system of claim 9, further comprising a lock pin that extends downward from a surface of the cover when the cover is in the closed position, the lock pin configured to inhibit outward expansion of at least a portion of the spring clip.

12. The optoelectronic system of claim 11, wherein:

the lock pin is positioned in a space laterally between a portion of the housing and a bottleneck portion of the spring clip when the cover is in the closed position to inhibit outward flexion of the bottleneck portion; and the space laterally between the portion of the housing and the bottleneck portion of the spring clip is empty when the cover is in the open position.

13. The optoelectronic system of claim 12, wherein the spring clip is sized and shaped to receive the ferrule through a flexible bottleneck opening at a bottleneck portion of the spring clip and into a receptacle portion of the spring clip, the bottleneck portion of the spring clip configured to flex into and de-flex out of a flex groove defined by the housing in response to the ferrule passing through the flexible bottleneck opening and in response to the ferrule exiting the flexible bottleneck opening, respectively.

14. The optoelectronic system of claim 13, wherein the bottleneck portion is positioned to abut the ferrule when the ferrule is inserted into the receptacle portion of the spring clip, the abutment of the bottleneck portion against the ferrule configured to bias the ferrule against the lens.

15. The optoelectronic system of claim 14, wherein:

the receptacle portion of the spring clip is rectangular and includes two opposing lateral arms extending a length of the receptacle portion; and the bottleneck portion of the spring clip includes:

two rounded portions positioned on opposing sides of the flexible bottleneck opening which together define the flexible bottleneck opening, each rounded portion of the two rounded portions connected to a different one of the two opposing lateral arms of the receptacle portion, a bottleneck width between the two rounded portions being less than a distance between the two opposing lateral arms of the receptacle portion at least when the spring clip is unflexed; and an elbow portion positioned adjacent to each opposing side of the flexible bottleneck opening, the elbow portion including a first portion connected to one of the two rounded portions and a second portion extending in a direction of the length of the receptacle portion, the second portion configured as a flex stop in response to the bottleneck portion flexing outward until the second portion abuts an outer limit of the flex groove when a lock pin extending from the cover is not positioned adjacent the bottleneck portion.

16. A method of to provide a secure ferrule-to-lens connection, the method comprising:

moving a cover connected to a housing of an optical assembly to an open position to expose male guide pins of a lens of the optical assembly, the male guide pins of the lens positioned within a receptacle portion of a spring clip;

visually aligning the male guide pins of the lens with corresponding female openings of a ferrule, the male guide pins oriented in a direction facing a bottleneck opening in a bottleneck portion of the spring clip;

inserting the ferrule through the bottleneck opening of the spring clip into the receptacle portion of the spring clip, the bottleneck portion of the spring clip configured to flex outward into a flex groove during the inserting;

mating the male guide pins of the lens with the female openings of the ferrule, the mating configured to be complete in response to the bottleneck portion abutting a rear portion of the ferrule opposite a front portion of the ferrule mated with the lens; and moving the cover of the optical assembly to a closed position such that lock pins of the cover cooperate with the spring clip to inhibit removal of the ferrule from the lens of the optical assembly.

17. The method of claim 16, wherein moving the cover to the open position includes rotating the cover or sliding the cover relative to the housing from the closed position to the open position.

18. The method of claim 16, wherein inhibiting removal of the ferrule includes inhibiting outward expansion of at least a portion of the spring clip via lock pins that extend downward from a bottom surface of the cover.

19. The method of claim 18, wherein inhibiting removal of the ferrule further includes positioning the lock pins laterally between a flex groove of the housing and the bottleneck portion of the spring clip.

20. The method of claim 16, further comprising biasing the ferrule against the lens.

* * * * *